UNITED STATES PATENT OFFICE.

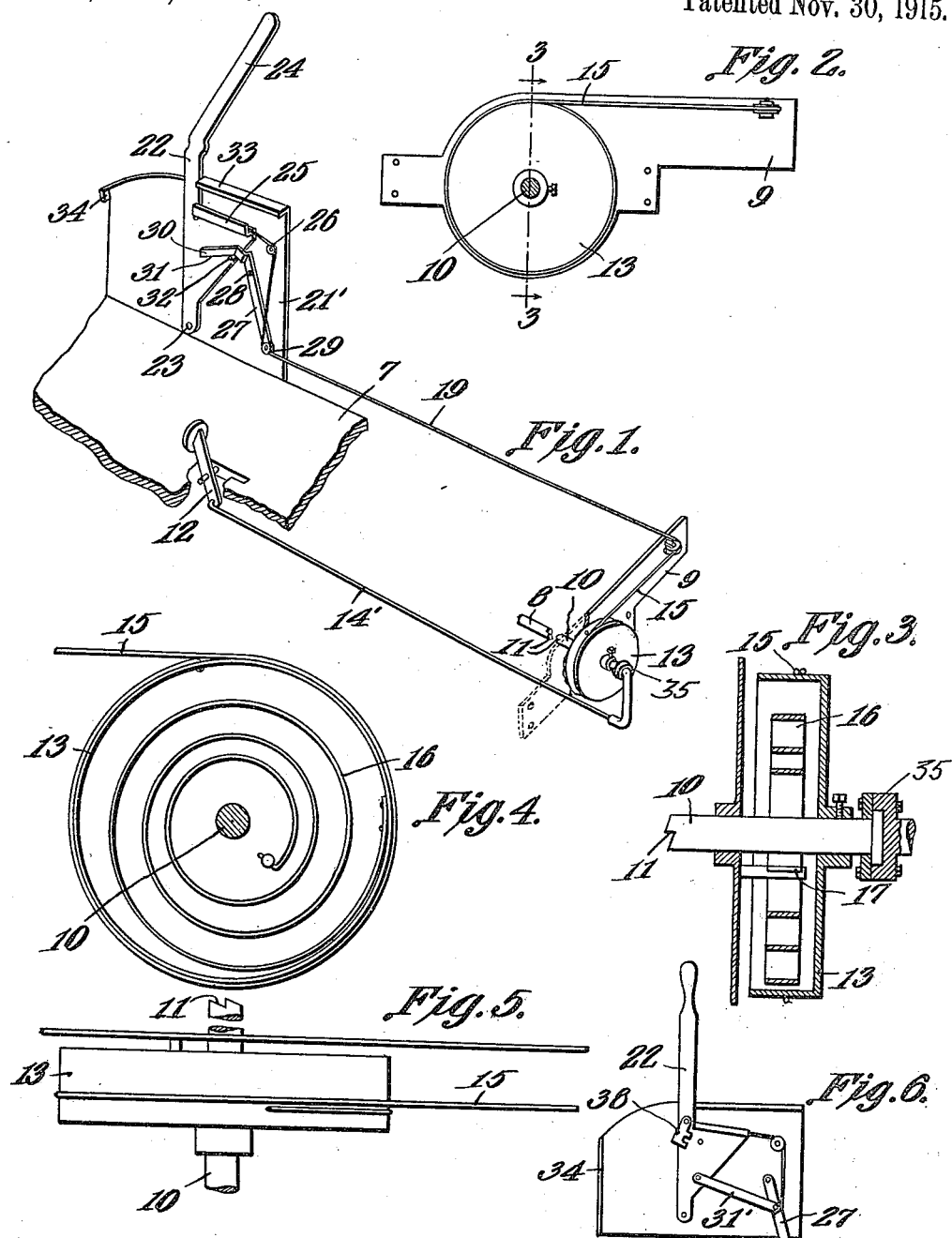

WILLIAM H. LARAWAY, OF GRAND RAPIDS, MICHIGAN, ASSIGNOR TO JOHN F. CARTER, OF GRAND RAPIDS, MICHIGAN.

ENGINE-STARTER.

1,162,619.  Specification of Letters Patent.  Patented Nov. 30, 1915.

Application filed July 23, 1914. Serial No. 852,667.

*To all whom it may concern:*

Be it known that I, WILLIAM H. LARAWAY, a citizen of the United States, residing at Grand Rapids, in the county of Kent and State of Michigan, have invented a new and useful Engine-Starter, of which the following is a specification.

This invention relates to engine starters and aims to provide a novel and improved hand operated device of that character which may be actuated from the seat.

One of the noteworthy features of the invention is the provision of unique means whereby a large movement is imparted to a flexible element connected operatively to the engine, although an actuating lever of limited length is employed.

Another object of the invention, is the provision of a manually operable engine starter, which is comparatively simple, non-encumbering and inexpensive in construction, which is readily applicable to various motor vehicles, which occupies little space, and which is convenient, practical and efficient in use.

With the foregoing and other objects in view which will appear as the description view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The preferred embodiment of the invention is illustrated in the accompanying drawing, wherein—

Figure 1 is a perspective view of the improved engine starter, fragmentary parts of the motor vehicle being shown. Fig. 2 is an enlarged front view of the engine shaft rotating mechanism. Fig. 3 is an enlarged cross section taken on the line 3—3 of Fig. 2. Fig. 4 is an enlarged rear view of the drum upon which the flexible element is wound. Fig. 5 is a top plan view of the engine shaft rotating mechanism. Fig. 6 is a side elevation of a modified form of actuating mechanism for the flexible element.

In the drawings the floor 7 represents a fragmental portion of a motor vehicle and is included in the drawing to depict a supporting structure for the clutch operating pedal and the mechanism whereby a flexible element is forcibly pulled in order to actuate the engine shaft turning mechanism. A fragmental portion of the engine shaft is illustrated at 8.

The engine shaft turning mechanism includes a supporting plate 9 through which is slidably journaled a clutch or starting shaft 10. The clutch shaft 10 and engine shaft 8 are provided with the interengageable and coacting ends 11 whereby the rotation in one direction of the clutch shaft 10 will produce a corresponding rotation of the engine shaft 8, but the engine having started, may continue to run in a forward direction without effecting or operating the clutch shaft 10. A pedal 12 is supported by the vehicle floor 7 and has a connecting rod 14 pivoted thereto which extends in front of the plate 9, and is connected to the clutch shaft 10 by the loose coupling 35, thus enabling the clutch shaft to be shifted without interfering with its free rotation.

A drum 13 is mounted upon the clutch shaft 10 in any suitable manner and has a cord or flexible element 15 wound thereon whereby the pulling and unwinding of the flexible element will result in the rotation of the drum and the corresponding motion of the clutch shaft 10. A spiral spring 16 is housed within the drum 13 and has one end rigidly secured, as at 17, to the supporting plate 9 and its other extremity fastened to the rim of the drum 13, whereby the drum will be yieldably returned to a normal or initial position to wind the flexible element 15 thereon. In this connection it is to be further noted that the spring also holds the clutch shaft 10 normally out of engagement with the engine shaft 8 and thus provides for the proper retractile force after the pedal 12 has been released.

The actuating device for pulling the flexible element 15 is carried by an upstanding bracket or plate 21′ rigidly secured to the floor 7, and embodies an upwardly projecting hand lever 22 having its lower end fulcrumed, as at 23, to the lower portion of the plate 21′ and having an upper angularly extending handle 24. The lever 22 has a forwardly projecting ledge 25 over which the flexible element 15 extends and to which one end of the element 15 is secured. The ledge or shelf provides for the proper pulling motion of the flexible element when the lever is swung and also guides and holds the flexible element in proper relation with respect to the lever. A pulley or guide 26 is carried by the plate 21 at a point higher than the lever fulcrum 23 and the flexible element extends over the pulley 26 from the ledge 25. In order to accentuate or accelerate the movement of the flexible element when the hand lever is swung, a downwardly projecting arm 27 is provided, the same being pivoted to the plate 21', as at 28, adjacent the pulley 26 and provided at its lower extremity with the pulley 29, engaging the flexible element 15. The arm has an upper cam extension 30 which is provided with the cam edge 31 coacting and contacting with a roller 32 carried by the lever, so that when the hand lever is moved rearwardly, the cam extension 30 will be raised and the arm 27 will be moved rearwardly.

The flexible element 15 extends downwardly from the pulley 26 to the pulley 29 and thence extends longitudinally forward, as at 19, to the plate 9. the forward end portion of the flexible element 15 being attached to and wound upon the drum, as above indicated.

The plate 21' is provided at its upper edge with the stops 33 and 34, which properly limit the movements of the lever 22.

In operation, when the handle 24 is grasped and the hand lever 22 swung rearwardly, so as to pull the flexible element 15 rearwardly, the roller 32 engaging the cam-extension 30 of the arm 27, will swing the arm 27 rearwardly also, and the pulley 29 carried by the arm 27 in engaging the flexible element 15, will give an additional rearward pulling movement to the flexible element, and as a consequence the movement of the flexible element will be accelerated. This causes the flexible element to be unwound properly from the drum, so that the drum will be rotated a sufficient number of times, for starting the engine. Before the hand lever is swung, the pedal 12 is pressed forwardly to bring the clutch shaft 10 into engagement with the engine shaft 8, so that the rotation of the drum 13 will rotate the engine shaft. When the pedal 12 is released, the spring 16 will release the clutch shaft 10 from the engine shaft 8, and when the hand lever 22 is released, the spring 16 will return the drum 13 to normal position, and will cause the flexible element to be wound thereon so as to turn the hand lever and arm 27 to normal position also.

In the modified form of actuating means illustrated in Fig. 6, the operative connection between the hand lever 22 and arm 27 embodies a link 31' terminally pivoted to the arm and lever, for causing the arm 27 to swing rearwardly when the lever is swung rearwardly, and to thus cause the accelerated movement of the flexible element. The lever 22 is preferably provided with a catch 38 to engage the rear stop 34 for holding the lever rearwardly out of the way, if desired.

Having thus fully described my invention, what I claim is:—

An engine starter comprising an upwardly projecting hand lever having a fulcrum at its lower end, a starting shaft having a drum thereon, a guide disposed higher than the fulcrum of the lever, a flexible element attached at one end to the lever and extending over the said guide, thence downwardly therefrom and thence extending to and being wound upon the said drum, an arm pivotally mounted adjacent the said guide and projecting downwardly, the arm having means at its lower end engaging the flexible element, and means operatively connecting the lever and arm in order that when the lever is swung to pull the flexible element, the said arm will be swung toward the fulcrum of the lever for accelerating the movement of the flexible element.

In testimony that I claim the foregoing as my own, I have hereto affixed my signature in the presence of two witnesses.

WILLIAM H. LARAWAY.

Witnesses:
L. A. STAFFORD,
P. L. ROGERS.